(12) United States Patent
Azima et al.

(10) Patent No.: US 6,359,991 B1
(45) Date of Patent: *Mar. 19, 2002

(54) GREETINGS OR THE LIKE CARD

(75) Inventors: Henry Azima, Cambridge; Martin Colloms, London; Neil John Harris, Great Shelford, all of (GB)

(73) Assignee: New Transducers Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/699,489

(22) Filed: Oct. 31, 2000

Related U.S. Application Data

(63) Continuation of application No. 09/011,835, filed on Sep. 21, 1998, and a continuation-in-part of application No. 08/707,012, filed as application No. PCT/GB96/02144 on Sep. 2, 1996.

(30) Foreign Application Priority Data

| Sep. 2, 1919 | (GB) | ............................................. 9517918 |
| Oct. 31, 1995 | (GB) | ............................................. 9522281 |
| Mar. 30, 1996 | (GB) | ............................................. 9606836 |

(51) Int. Cl.[7] ............................................. H04R 25/00
(52) U.S. Cl. ..................... 381/152; 381/190; 40/124.01
(58) Field of Search ....................... 361/813; 40/124.01, 40/124.09, 191; 381/152, 190, 191, 431, 423, FOR 151, FOR 165

(56) References Cited

U.S. PATENT DOCUMENTS

| 2,524,143 A | | 10/1950 | Smith |
| 2,826,844 A | | 3/1958 | Leika |
| 3,247,925 A | | 4/1966 | Warnaka |
| 3,347,335 A | | 10/1967 | Watters et al. |
| 4,198,550 A | | 4/1980 | Matsuda et al. |
| 4,299,041 A | | 11/1981 | Wilson |
| 4,363,081 A | | 12/1982 | Wilbur |
| 4,425,098 A | | 1/1984 | Doring |
| 4,611,262 A | * | 9/1986 | Galloway et al. ........... 361/813 |
| 6,181,799 B1 | * | 1/2001 | Azima et al. ............... 381/152 |

FOREIGN PATENT DOCUMENTS

| DE | 32 39 597 | 4/1984 |
| DE | 41 17 022 | 2/1992 |
| EP | 0 034 024 | 8/1981 |
| GB | 2 010 637 | 6/1979 |
| GB | 2 137 560 | 10/1984 |
| GB | 2 268 119 | 1/1994 |
| WO | WO 92/03024 | 2/1992 |

* cited by examiner

*Primary Examiner*—Curtis Kuntz
*Assistant Examiner*—Suhan Ni
(74) *Attorney, Agent, or Firm*—Foley & Lardner

(57) ABSTRACT

A greetings or the like card (144), characterised by a board (2) forming at least part of the card and in that the board is a distributed mode acoustic radiator having a transducer (9) mounted wholly and exclusively on the radiator to vibrate the radiator to cause it to resonate.

6 Claims, 4 Drawing Sheets

GREETINGS OR THE LIKE CARD

This application is a continuation of application Ser. No. 09/011,835, filed Sep. 21, 1998, as PCT/GB96/02144, filed Sep. 2, 1996, a continuation-in-part of application Ser. No. 08/707,012, filed Sep. 3, 1996.

TECHNICAL FIELD

The invention relates to greetings or the like cards.

1. Background Art

It is known from GB-A-2262861 to suggest a panel-form loudspeaker comprising:

a resonant multi-mode radiator element being a unitary sandwich panel formed of two skins of material with a spacing core of transverse cellular construction, wherein the panel is such as to have ratio of bending stiffness (B), in all orientations, to the cube power of panel mass per unit surface area ($\mu$) of at least 10;

a mounting means which supports the panel or attaches to it a supporting body, in a free undamped manner;

and an electro-mechanical drive means coupled to the panel which serves to excite a multi-modal resonance in the radiator panel in response to an electrical input within a working frequency band for the loudspeaker.

DE-A-3,239,597 of MARCO POLO discloses a greetings card comprising a tone generator.

2. Disclosure of Invention

Embodiments of the present invention use members of nature, structure and configuration achievable generally and/or specifically by implementing teachings of our parent application Ser. No. 08/707,012. Such members thus have capability to sustain and propagate input vibrational energy by bending waves in operative area(s) extending transversely of thickness often but not necessarily to edges of the member(s); are configured with or without anisotropy of bending stiffness to have resonant mode vibration components distributed over said area(s) beneficially for acoustic coupling with ambient air; and have predetermined preferential locations or sites within said area for transducer means, particularly operationally active or moving part(s) thereof effective in relation to acoustic vibrational activity in said area(s) and signals, usually electrical, corresponding to acoustic content of such vibrational activity. Uses are envisaged in parent application Ser. No. 08/707,012 for such members as or in "passive" acoustic devices without transducer means, such as for reverberation or for acoustic filtering or for acoustically "voicing" a space or room; and as or in "active" acoustic devices with transducer means, such as in a remarkably wide range of sources of sound or loudspeakers when supplied with input signals to be converted to said sound, or in such as microphones when exposed to sound to be converted into other signals.

This invention is particularly concerned with greetings and the like cards incorporating acoustic devices e.g. in the form of loudspeakers. The term 'greetings card' is intended to encompass analogous cards such, for example as advent calendars and the like.

Members are above are herein called distributed mode radiators and are intended to be characterised as in the above parent application and/or otherwise as specifically provided herein.

The invention is a greetings or the like card having at least one leaf, characterised by a loudspeaker comprising a board forming a leaf of the card and in that the board is a member having capability to sustain and propagate input vibrational energy by bending waves in at least one operative area extending transversely of thickness to have resonant mode vibration components distributed over said at least one area and have predetermined preferential locations or sites within said area for transducer means and having a transducer mounted wholly and exclusively on said member at one of said locations or sites to vibrate the member to cause it to resonate forming an acoustic radiator which provides an acoustic output when resonating. The member may have a cellular core sandwiched between skin layers. The member may comprise a core of foamed plastics sandwiched between sheets of craft board. The transducer may be a piezoelectric bender. The bender may be crystalline. The card may comprise a pair of leaves, and means associated with the leaves for triggering actuation of the transducer on movement of one leaf relative to the other leaf. The card may comprise a signal generator, an amplifier and an electric battery on a leaf of the card to drive the transducer. The member may be adapted to receive printed matter.

BRIEF DESCRIPTION OF DRAWINGS

The invention is diagrammatically illustrated, by way of example, in the accompanying drawings, in which.

BEST MODES FOR CARRYING OUT THE INVENTION

Figure 1:
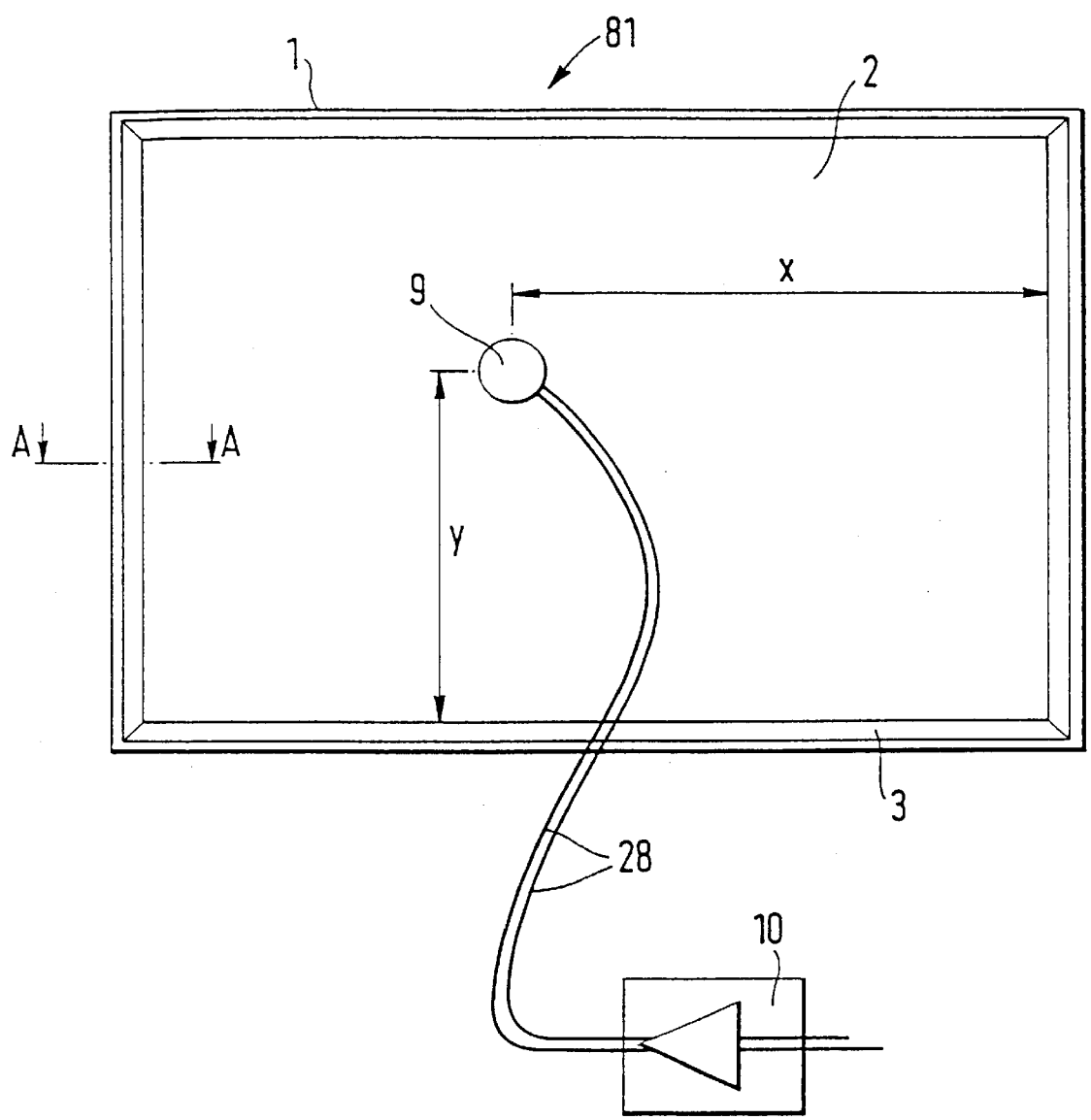
FIG. 1 is a diagram showing a distributed-mode loudspeaker as described and claimed in our parent application Ser. No. 08/707,012.
Figure 4:
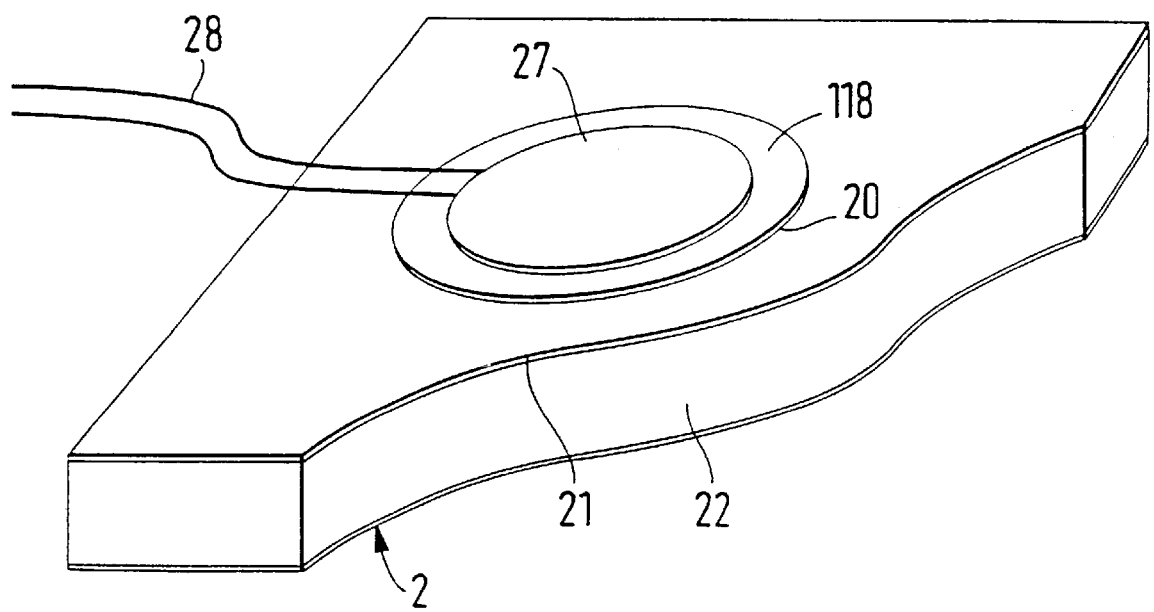
FIG. 4 is a perspective view of a transducer.

Referring to FIG. 1 of the drawings, there is shown a panel-form loudspeaker (81) of the kind described and claimed in our parent application Ser. No. 08/707,012 comprising a rectangular frame (1) carrying a resilient suspension (3) round its inner periphery which supports a distributed mode sound radiating panel (2). A transducer (9) as described in FIG. 4, is mounted wholly and exclusively on or in the panel (2) at a predetermined location defined by dimensions x and y, the position of which location is calculated as described in our parent application Ser. No. 08/707,012 to launch bending waves into the panel to cause the panel to resonate to radiate an acoustic output. The transducer (9) is driven by a signal amplifier (10), e.g. an audio amplifier, connected to the transducer by conductors (28).

Figure 2A:
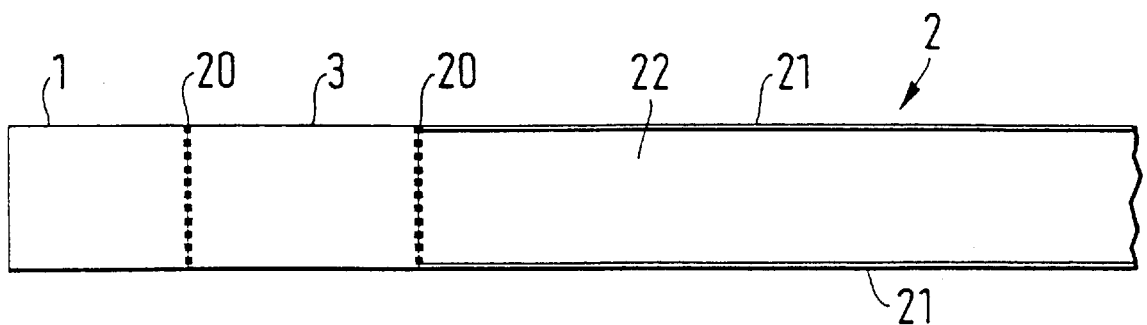
FIG. 2a is a partial section on the line A—A of FIG. 1.
Figure 2B:
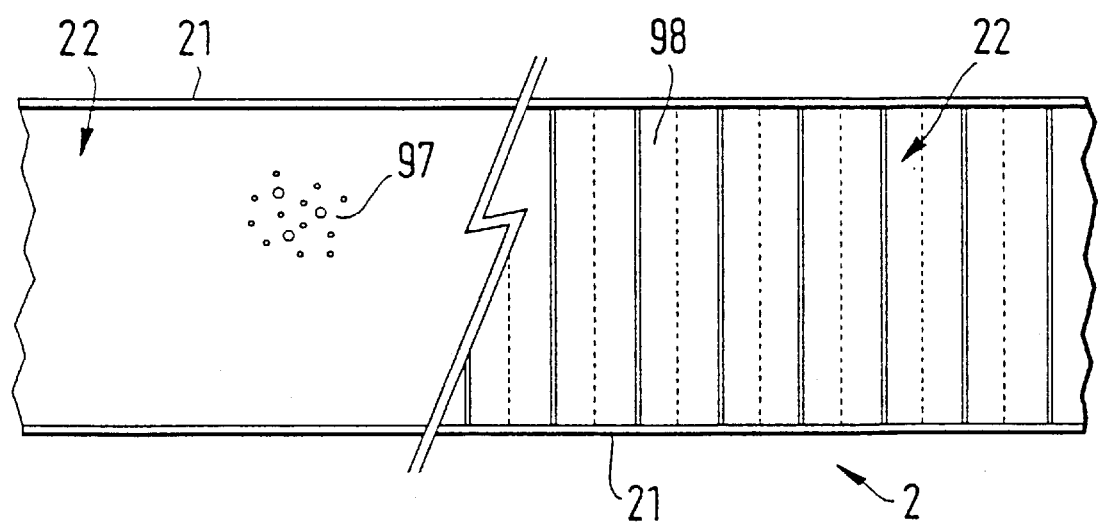
FIG. 2b is an enlarged cross-section through a distributed mode radiator of the kind shown in FIG. 2a and showing two alternative constructions.

FIGS. 2a and 2b are partial typical cross-sections through the loudspeaker (81) of FIG. 1. FIG. 2a shows that the frame (1), surround (3) and panel (2) are connected together by respective adhesive-bonded joints (20). Suitable materials for the frame include lightweight framing, e.g. picture framing of extruded metal e.g. aluminium alloy or plastics. Suitable surround materials include resilient materials such as foam rubber and foam plastics. Suitable adhesives for the joints (20) include epoxy, acrylic and cyano-acrylate etc. adhesives.

FIG. 2b illustrates, to an enlarged scale, that the panel (2) is a rigid lightweight panel having a core (22) e.g. of a rigid plastics foam (97) e.g. cross linked polyvinylchloride or a cellular matrix (98) i.e. a honeycomb matrix of metal foil, plastics or the like, with the cells extending transversely to the plane of the panel, and enclosed by opposed skins (21) e.g. of paper, card, plastics or metal foil or sheet. Where the skins are of plastics, they may be reinforced with fibres e.g. of carbon, glass, Kevlar or the like in a manner known per se to increase their modulus.

Envisaged skin layer materials and reinforcements thus include carbon, glass, Kevlar (RTM), Nomex (RTM) i.e. aramid etc. fibres in various lays and weaves, as well as paper, bonded paper laminates, melamine, and various synthetic plastics films of high modulus, such as Mylar (RTM), Kaptan (RTM), polycarbonate, phenolic, polyester or related plastics, and fibre reinforced plastics, etc. and metal sheet or foil. Investigation of the Vectra grade of liquid crystal polymer thermoplastics shows that they may be useful for the injection moulding of ultra thin skins or shells of smaller size, say up to around 30 cm diameter. This material self forms an orientated crystal structure in the direction of injection, a preferred orientation for the good propagation of treble energy from the driving point to the panel perimeter.

Envisaged core layer materials include fabricated honeycombs or corrugations of aluminium alloy sheet or foil, or Kevlar (RTM), Nomex (RTM), plain or bonded papers, and various synthetic plastics films, as well as expanded or foamed plastics or pulp materials, even aerogel metals if of suitably low density. Some suitable core layer materials effectively exhibit usable self-skinning in their manufacture and/or otherwise have enough inherent stiffness for use without lamination between skin layers. A high performance cellular core material is known under the trade name 'Rohacell' which may be suitable as a radiator panel and which is without skins. In practical terms, the aim is for an overall lightness and stiffness suited to a particular purpose, specifically including optimising contributions from core and skin layers and transitions between them.

The suspension (3) may damp the edges of the panel (2) to prevent excessive edge movement of the panel. Additionally or alternatively, further damping may be applied, e.g. as patches, bonded to the panel in selected positions to damp excessive movement to distribute resonance equally over the panel. The patches may be of bitumen-based material, as commonly used in conventional loudspeaker enclosures or may be of a resilient or rigid polymeric sheet material. Some materials, notably paper and card, and some cores may be self-damping. Where desired, the damping may be increased in the construction of the panels by employing resiliently setting, rather than rigid setting adhesives.

Effective said selective damping includes specific application to the panel including its sheet material of means permanently associated therewith. Edges and corners can be particularly significant for dominant and less dispersed low frequency vibration modes of panels hereof. Edge-wise fixing of damping means can usefully lead to a panel with its said sheet material fully framed, though their corners can often be relatively free, say for desired extension to lower frequency operation. Attachment can be by adhesive or self-adhesive materials. Other forms of useful damping, particularly in terms of more subtle effects and/or mid- and higher frequencies can be by way of suitable mass or masses affixed to the sheet material at predetermined effective medial localised positions of said area.

An acoustic panel as described above is bi-directional. The sound energy from the back is not strongly phase related to that from the front. Consequently there is the benefit of overall summation of acoustic power in the room, sound energy of uniform frequency distribution, reduced reflective and standing wave effects and with the advantage of superior reproduction of the natural space and ambience in the reproduced sound recordings.

While the radiation from the acoustic panel is largely non-directional, the percentage of phase related information increases off axis. For improved focus for the phantom stereo image, placement of the speakers, like pictures, at the usual standing person height, confers the benefit of a moderate off-axis placement for the normally seated listener optimising the stereo effect. Likewise the triangular left/right geometry with respect to the listener provides a further angular component. Good stereo is thus obtainable.

There is a further advantage for a group of listeners compared with conventional speaker reproduction. The intrinsically dispersed nature of acoustic panel sound radiation gives it a sound volume which does not obey the inverse square law for distance for an equivalent point source. Because the intensity fall off with distance is much less than predicted by inverse square law then consequently for off-centre and poorly placed listeners the intensity field for the panel speaker promotes a superior stereo effect compared to conventional speakers. This is because the off-centre placed listener does not suffer the doubled problem due to proximity to the nearer speaker; firstly the excessive increase in loudness from the nearer speaker, and then the corresponding decrease in loudness from the further loudspeaker.

There is also the advantage of a flat, lightweight panel-form speaker, visually attractive, of good sound quality and requiring only one transducer and no crossover for a full range sound from each panel diaphragm.

Figure 3:
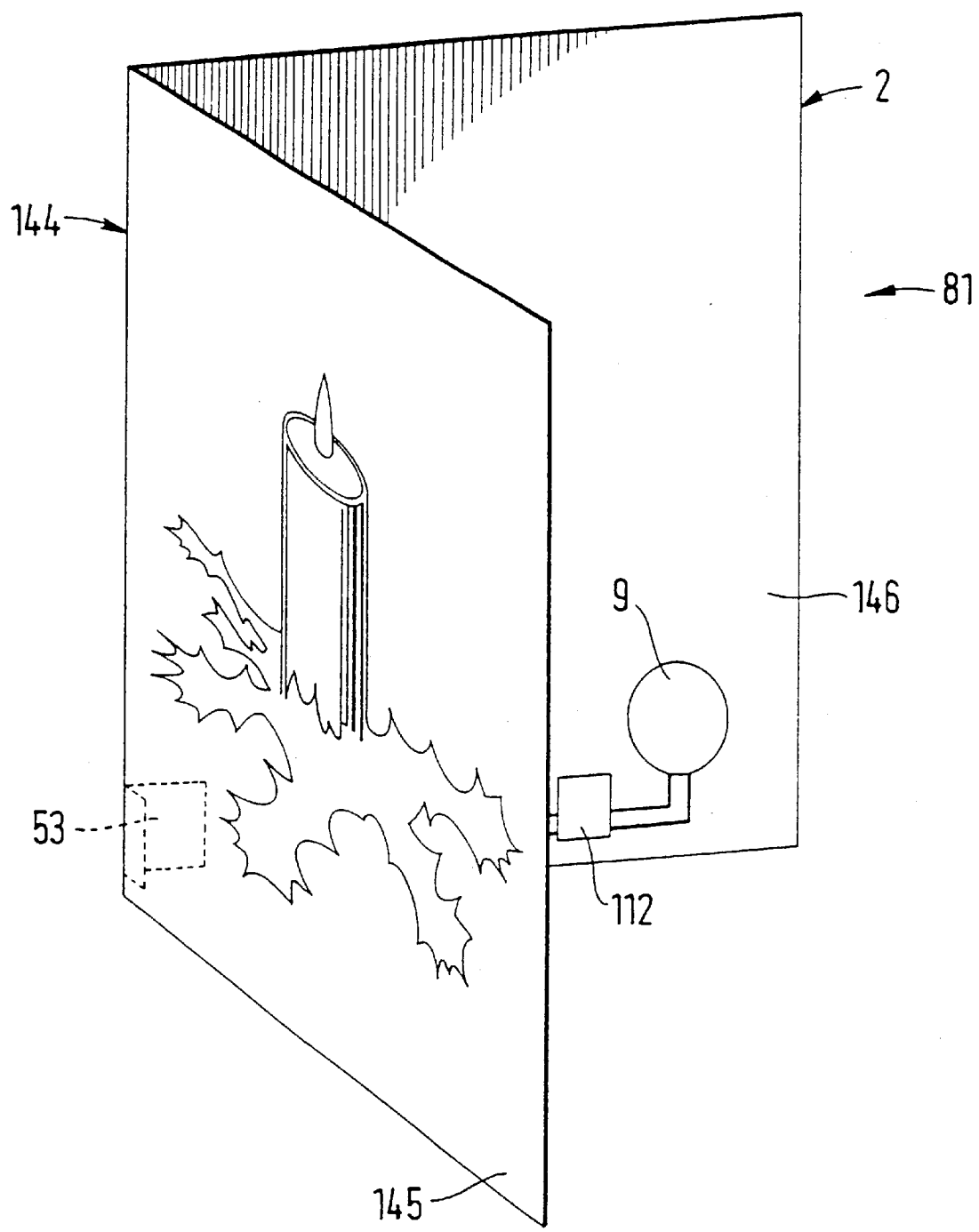
FIG. 3 is a perspective diagram of an embodiment of greetings card according to the present invention.

FIG. 3 illustrates a greetings or the like card (144) incorporating loudspeaker technology of FIGS. 1 and 2. The card is in the form of a folded member having a front leaf (145) and a rear leaf (146). At least the rear leaf (146) is made from a composite board consisting of a core (22) of foam plastics sandwiched by skins of craft board (21) to form a rigid lightweight distributed mode acoustic radiator panel (2) of the kind described in FIGS. 1 and 2. Such composite boards are known under the trade name KAPPA-BOARD. It has been found that a panel shaped according to the European standard 'A' series is suitable.

A transducer (9) as shown in FIG. 4 is attached to the rear leaf (146) to vibrate the panel (2) to cause it to resonate to produce an acoustic output. The transducer (9) is driven by a signal generator/amplifier/battery unit (112) which is actuated by a switch (53) concealed in the fold of the card so as to activate the signal generator when the card is opened.

It will be noted that in this arrangement, no frame (1) or surround (3) is required. Sufficient damping of the card is provided either by the material from which the card is constructed and/or by holding the card or standing it on a surface.

FIG. 4 shows a transducer (9) for a distributed mode panel (2) in the form of a crystalline disc-like piezo bender (27) mounted on a disc (118), e.g. of brass, which is bonded to a face of the panel (2), e.g. by an adhesive bond (20). In operation an acoustic signal applied to the transducer (9) via leads (28) will cause the piezo disc (27) to bend and thus locally resiliently deform the panel (2) to launch bending waves into the panel.

What is claimed is:

1. A greetings card comprising:
   at least one leaf in the form of a panel member, the member having selected values of certain physical parameters which enable the member to sustain and propagate input vibrational energy in a predetermined frequency range by a plurality of resonant bending wave modes in at least one operative area extending transversely of thickness such that the frequencies of the resonant bending wave modes along at least two conceptual axes of the operative area are interleaved and spread so that there are substantially minimal clusterings and disparities of spacings of said frequencies, the member when resonating having at least one site at which the number of vibrationally active resonance anti-nodes is relatively high; and a transducer mounted wholly and exclusively on the member at one of said sites on the member, the transducer being capable of vibrating the member in the predetermined frequency range to couple to and excite the resonant bending wave modes in the member and cause the member to resonate and produce an acoustic output.

2. A greetings card according to claim 1, wherein the member comprises a board having a cellular core sandwiched between skin layers.

3. A greetings card according to claim 2, wherein the board comprises a core of foamed plastics sandwiched between sheets of craft board.

4. A greetings card according to claim 1, claim 2 or claim 3, wherein the transducer is a piezo-electric bender.

5. A greetings card according to claim 4, wherein the bender is crystalline.

6. A greetings card according to claim 1, wherein the member is adapted to receive printed matter.

* * * * *